S. D. POOLE.
CULTIVATOR.
APPLICATION FILED JUNE 29, 1908.
1,116,839.
Patented Nov. 10, 1914.
2 SHEETS—SHEET 1.
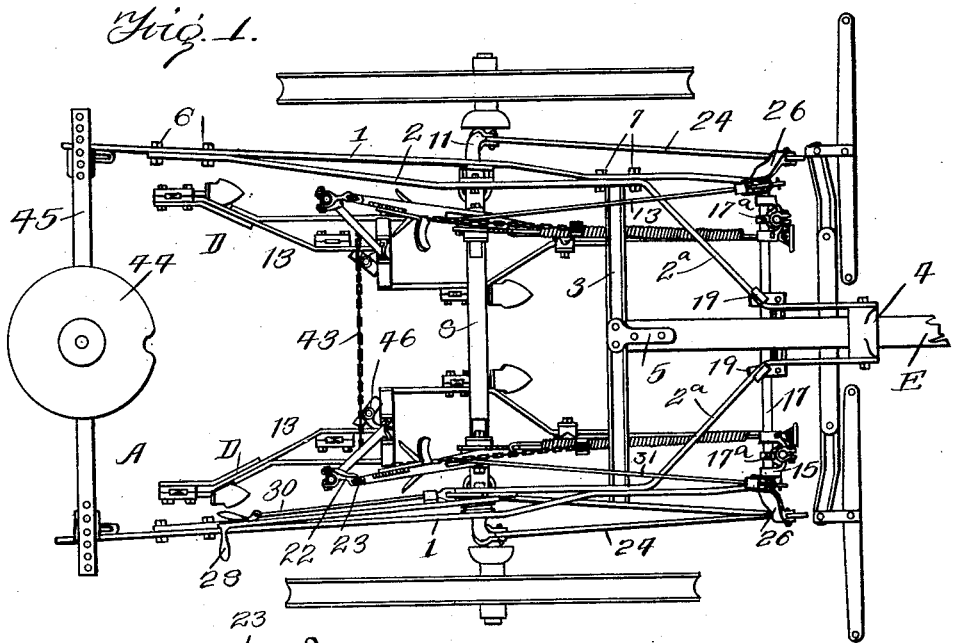
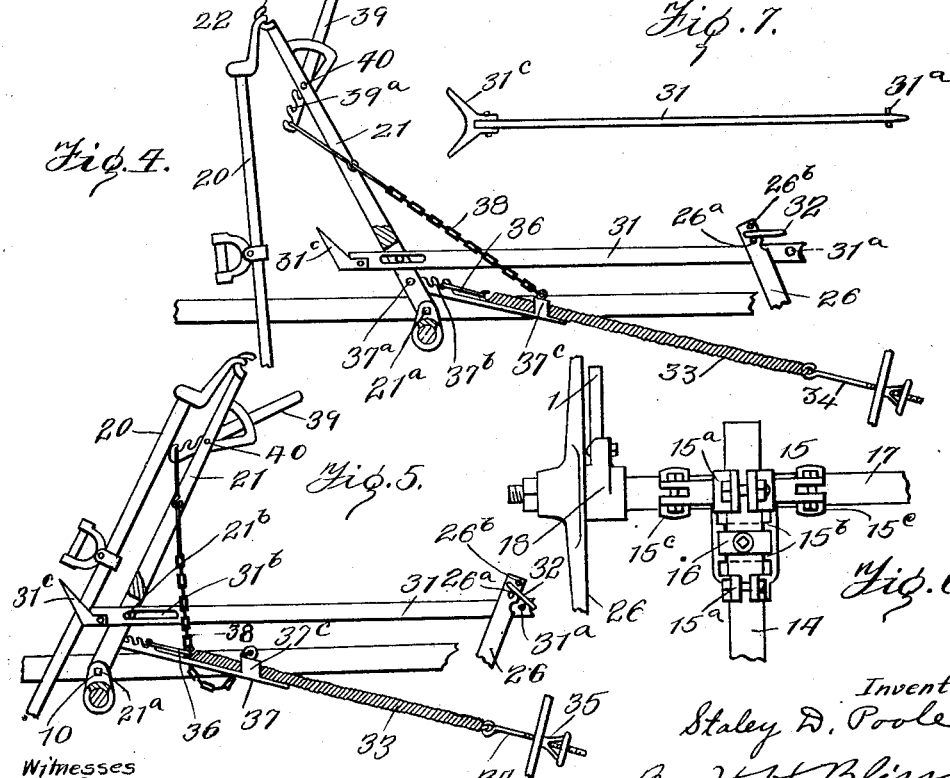
Witnesses
B. F. Brown
N. E. Costello
Inventor
Staley D. Poole
By H. H. Bliss
Atty S. D. POOLE.
CULTIVATOR.
APPLICATION FILED JUNE 29, 1908.
1,116,839.
Patented Nov. 10, 1914.
2 SHEETS—SHEET 2.
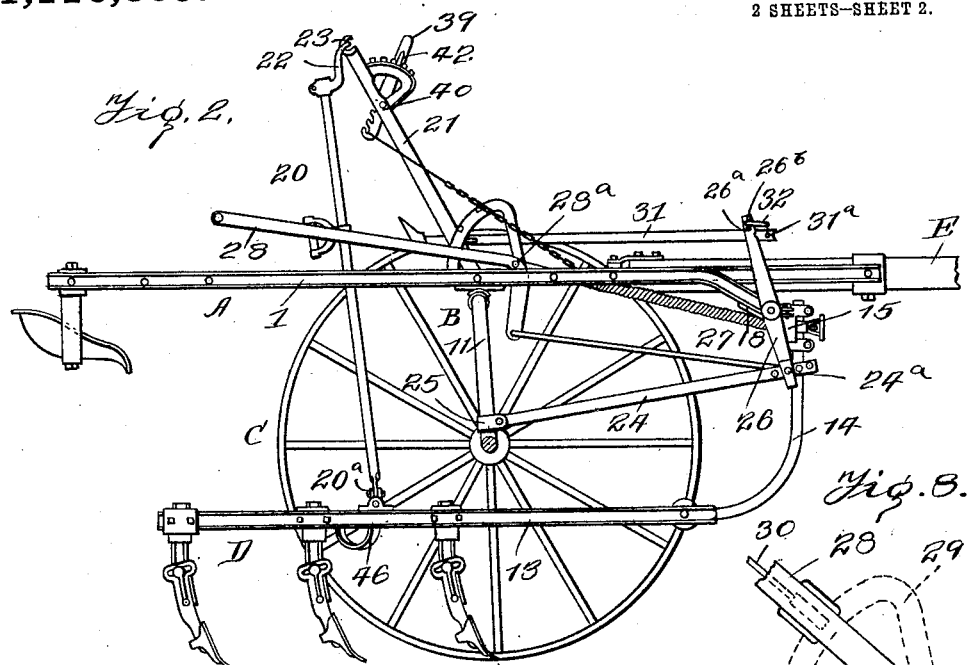
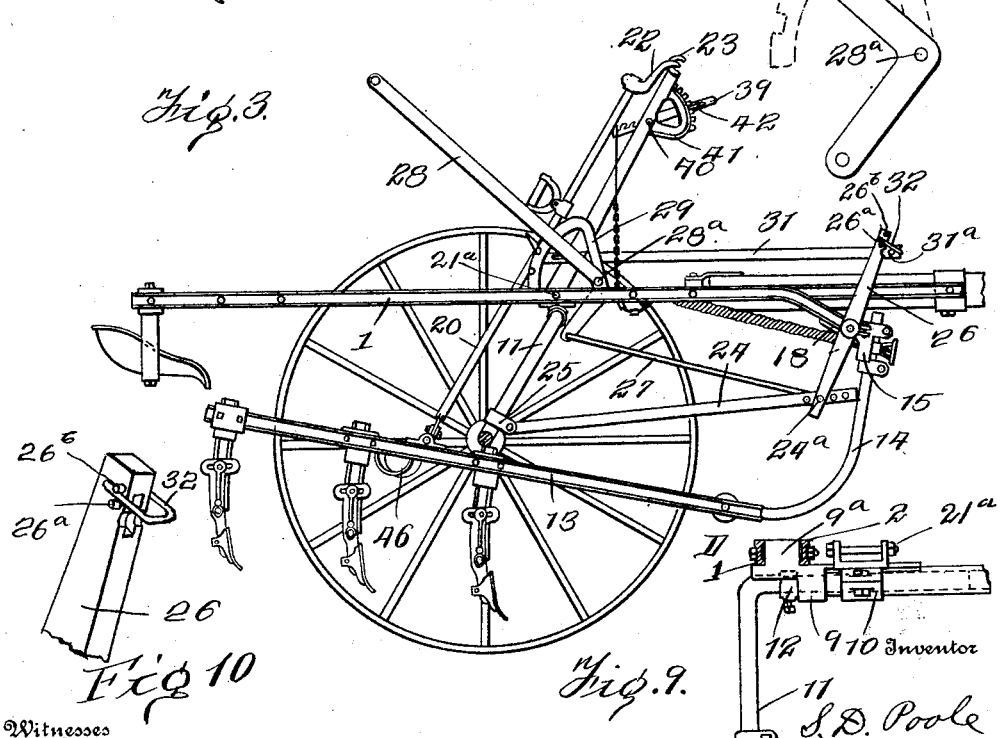

UNITED STATES PATENT OFFICE.

STALEY D. POOLE, OF MOLINE, ILLINOIS, ASSIGNOR TO DEERE & CO., A CORPORATION OF ILLINOIS.

CULTIVATOR.

1,116,839. Specification of Letters Patent. Patented Nov. 10, 1914.

Application filed June 29, 1908. Serial No. 440,866.

*To all whom it may concern:*

Be it known that I, STALEY D. POOLE, a citizen of the United States, residing at Moline, in the county of Rock Island and State of Illinois, have invented certain new and useful Improvements in Cultivators, of which the following is a specification, reference being had therein to the accompanying drawing.

This invention relates to improvements in earth working implements of the wheeled cultivator class, although it will be seen that the novel matters are not limited to any particular form of tool in respect to which there can be more or less modification.

Figure 1 is a top plan view of a cultivator having parts constructed and related in such way that the implement embodies my improvements. Fig. 2 is a side view showing the operative parts and those connected therewith in their operative positions. Fig. 3 is a side view of the implement when the earth working parts are in their elevated position. Fig. 4 is a side view of the radius arm, the upper part of the suspending rod, the spring and the stopping and holding devices interposed between the suspending rod and radius arm, these parts being in relative position shown in Fig. 2. Fig. 5 is a side view of the same parts when in the relative position shown in Fig. 3. Fig. 6 is a front view of the attachment for connecting the front end of the drag bar to the cross frame bar. Fig. 7 is a plan view of the stopping and holding devices interposed between the suspending rod and the radius arm and the bar or rod which carries them. Fig. 8 is a side view of the lower part of the hand lever detached. Fig. 9 is a detail view showing in rear elevation a part of the arched axle and some of its associated parts. Fig. 10 is a detail perspective view showing the upper slotted end of one of the levers or cross-heads 26.

As shown in the drawings, the implement comprises a main frame A, axle parts B having wheels C, a tool frame D, and a tongue E.

The main frame comprises two sets of side bars 1, 2, and a cross bar 3. The bars 2 are bent inward at their front ends as shown at 2ª and carry a casting 4 in which the tongue E is secured, the rear end of the tongue being rigidly fastened to the cross bar 3 by means of the plate 5. The bars 1 and 2 are secured together by means of bolts 6 and 7 and, intermediate these two sets of bolts, are spread apart as clearly shown in Fig. 1.

The main frame further comprises a tube 8 which carries at either end castings 9 which are secured to the tube by means of the clamping band 10 which serves another purpose as will later appear. The castings 9 are provided with an upstanding flange or extension 9ª which is securely clamped by means of a bolt or the like between the frame bars 1 and 2. Two cranked axles 11, upon which the wheels C are mounted, have their upper horizontal parts rotatably and telescopically mounted in the ends of tube 8. Each axle is provided with an adjustable collar 12 which projects at its upper side into a groove formed in the casting 9, the construction being such that the axle is always free to have a limited turning movement within the tube 8, while it is held against endwise movement by the engagement of the collar with the casting. At the same time, by loosening the set screw of the collar, the axle may be moved in or out to narrow or widen the track of the cultivator, the set screw then being turned tight to secure the parts in adjusted relation.

The tool carrying frame may be of the drag-bar type and, as shown, comprises the rearwardly extending bars 13 to which are attached the hoes, shovels, disks or other earth working tools. At the front these drag bars or frames have upwardly turned arms 14 which are rotatably mounted in bearing castings 15. These castings have split sleeve parts 15ª which are provided with clamping bolts by means of which the bearing parts of the casting may be adjusted to take up wear and insure a close working fit of the arm 14. Longitudinal movement of the arm within the casting is prevented by means of a collar 16 which is adjustably secured upon the arm and which is disposed between flanges 15ᵇ of the casting.

The castings 15 are themselves rotatably mounted upon a transverse shaft 17, being provided with rearwardly extending bearing sleeves 15ᶜ to receive the shaft 17. Collars 17ª adjustably secured by set screws on the shaft 17 engage lugs on the castings 15 to prevent longitudinal movement of the latter on the shaft, while allowing free oscillating movement in vertical planes. The shaft 17 is mounted in bearing brackets 18 secured to the front ends of the frame bars 1 and also has bearing support in brackets 19 which are carried by the inturned parts 2ª of the frame bars 2.

The tool-carrying bars or frames (the drag bars) are, at points near their rear ends, supported from the axle frame and the main frame in such way that the tools may be readily let down to their operative position and lifted to inoperative position and can be adjusted as desired within limits.

The suspending and adjusting devices comprise the following: 20 is a suspending rod secured at its lower end by means of a universal connection 20ª to the drag bar or frame, and at its upper end flexibly connected to a radius arm 21 which is pivotally mounted at 21ª on the clamping band 10 previously referred to. 22 is a short arm rigidly secured to the upper end of the suspending rod 20 and flexibly connected to the radius bar 21 by the hook 23. It will be seen that the bars 20 and 21 are so related to each other and the other parts that by pushing the upper ends of these bars forward to the position shown in Fig. 3, the drag bar or frame will be elevated to the position shown in that figure; and that when the upper ends of the suspending rods are turned backward to the position shown in Fig. 2, the drag bars or frames will be let down to their operating positions in engagement with the ground.

For the purposes of easily and conveniently raising and lowering the tools and effecting the various adjustments desired, the following devices are employed: Links 24 are hinged at their rear ends to clips 25 secured to the axles 11 near the wheel axis. These links 24 extend forward and are pivotally connected at 24ª to the lower ends of levers 26 which are rigidly secured to the ends of the cross shaft 17. To make the pivotal connections 24ª adjustable the links 24 are provided with a series of holes at their front ends as shown. A link 27 is pivotally connected at its front end to the lower end of one of the levers 26, and at its rear end to the lower end of a hand lever 28. This hand lever is pivotally mounted at 28ª on a toothed segment bar 29 which is rigidly mounted on the side bars of the main frame, the lever being provided with a thumb lock 30 to lock it in adjusted position. The link 31 extends from the upper end of each lever 26 backward to the corresponding radius arm 21. The upper end of each lever is formed with a slot through which the link 31 slidably extends and is notched on its front side to be engaged by a cross pin 31ª carried by the link 31. 32 is a loop pivoted to the upper end of lever 26 and adapted to swing over and engage the notched end of link 31. The levers carry stop lugs 26ª, 26ᵇ, which serve to limit the pivotal movement of loops 32. At its rear end the link 31 extends through a slot in the radius arm 21 and is formed with a slot 31ᵇ to engage a pin 21ᵇ carried by the radius arm 21. The fork 31ᶜ, having diverging arms, is secured to the rear end of the link 31 in position to receive the suspending rod 20 when it is in its forward position as shown in Figs. 3 and 5. The link 24, lever 26, and link 31 constitute a connection adapted to positively transmit the movement of axle 11 to the radius arm 21. At the same time the coupling between the link 31 and radius arm 21 formed by the pin 21ᵇ and slot 31ᵇ permits a certain lost motion, the object of which will be referred to later. 33 is a coiled spring secured at its front end to the casting 15 by means of a threaded rod 34, which passes through a part of said casting, and a hand nut 35 which engages the threaded rod and by means of which the tension of the spring may be adjusted. The rear end of the spring is connected by means of a link 36 to an arm 37 which is pivotally secured at 37ª to the radius arm 21. This arm 37 is formed with a series of hooks 37ᵇ adapted to receive the link 36 so that the tension of the spring may be further adjusted by changing the loop from one hook to another. The arm 37 has a loop or eye 37ᶜ through which the spring 33 passes and to which is secured the lower or front end of a chain or other flexible device 38, said chain being connected at its upper end to the radius arm 21. The latter connection is preferably such as to permit of adjustment, the devices for providing such adjustment comprising preferably a lever 39 pivotally mounted at 40 upon the radius arm 21, and the toothed segment 41 with which a locking detent 42 is arranged to engage. Additional adjustment is provided by the series of hooks 39ª on the lever 39 to any one of which the upper end of chain 38 may be secured.

The suspending bars 20 may be connected by a chain 43 to limit the spreading of the tool bars.

A seat 44 for the operator is mounted upon a bar or strap 45 which is adjustably secured at its end to the rearward extending ends of the frame bars 1.

The mode of operation of an implement having parts constructed and related in the way shown, will be readily understood from the above description taken in connection with the drawing.

By referring to Fig. 2 it will be seen that when the tools are in their normal position for operation, the wheel axis is approximately in a vertical plane through the tubular part 8 of the main frame; that the suspending rods 20 and the radius bars 21 are inclined backward from the axle; that the levers 26 have their lower ends thrown forward and their upper ends backward; that the hand lever 28 is in its lowermost position with the locking device 30 in engagement with the toothed segment 29; that the links 24 and 27 are drawn forward; that the links 31 have their front ends extending through the slots in the levers 26 so that neither the cross pin 31$^a$ nor the notched end of the link is in engagement with the lever 26 or the loop 32, the links being therefore free to slide back and forth with respect to the levers 26; and that the chains 38 are under tension. In contrast with this, it will be seen by examining Fig. 3 that when the tools are in their elevated or inoperative position, the main axis is in a vertical plane behind the tube 8 of the wheel frame, the main frame being relatively advanced in relation to the wheel axis; that the levers 26 have their lower ends turned backward and their upper ends correspondingly thrown forward; that the suspension rods 20 and radius arms 21 are thrown forward at their upper ends; that the hand lever 28 is in its uppermost position; that the loops 32 carried by the upper ends of levers 26 are in engagement with the notched ends of links 31; and that the chains 38 are slack.

Assuming that the parts are in the positions shown in Fig. 2 when the driver, who rides in the seat 44, desires to lift the tools to an inoperative position, he need only release the lock 30 which holds the hand lever 28 in its lowermost position. As soon as this lock is released, the draft of the team tends to pull the main frame forward with respect to the wheel axles and as soon as such a movement has begun, the weight of the frame and the driver acts to the same end so that the main frame and the wheels promptly move into the relative positions shown in Fig. 3. As the wheels move relatively backward, they transmit their motion through the links 24 to the levers 26 so that the upper ends of the latter are thrown forward, in which movement they engage the cross pins 31$^a$ of the links 31 and move the latter forward. As these links 31 move forward, they pull upon the radius arms 21 swinging the latter upward and forward and with them the suspending rods 20, so that the tools are lifted into the inoperative position shown in Fig. 3, the suspending rods 20 finding a resting place in the forks 31$^c$ on the rear ends of links 31. These movements of the various parts, from the positions shown in Fig. 2 to the positions shown in Fig. 3, are aided by the springs 33 which pull forward on the radius arms 21.

It will further be observed that the relative forward movement of the frame with respect to the wheels, in addition to effecting the elevation of the tools, serves to maintain the balance of the implement. By making the pivotal connections 24$^a$ in one or another of the holes in the front ends of links 24, the implement can be balanced for drivers of different weights.

To lower the tools into operative position again, the lever 28 is thrown down to the position shown in Fig. 2. This movement is transmitted by link 27 to the levers 26 moving the lower ends of the latter forward and with them the links 24 and the wheel axles. At the same time, the upper ends of the levers 26 swing backward and as the loops 32 are in engagement with the ends of links 31 at the beginning of this movement, the latter are thrust backward so as to swing the radius arms 21 and the suspending bars 20 backward. As soon as the radius arms 21 pass the vertical position, in this backward movement, the weight of the suspended tools materially assists the remainder of the movement which is terminated when the chains 38 are drawn taut. There is no sudden shock at this time because the forward ends of the chains 38 are secured to the arms 37 which bear upward against the coiled springs 33 so as to utilize their elasticity by bending them laterally.

Referring somewhat more in detail to the function of the loop 32, it will be observed that said loop is allowed to swing to a limited extent between the stops 26$^a$, 26$^b$. With these parts in the positions shown in Fig. 2, the loop rests upon stop 26$^a$, but as the upper end of the lever 26 swings forward, its angular relation to the link 31 changes and the loop swings downward relative to the link enough to engage the notched end thereof, as shown in Fig. 3. When the tools are lowered the upper end of the lever 26 swings backward from the position shown in Fig. 3 and in this movement the loop 32 is caused by the stop 26$^a$ to swing upward until it is disengaged from the end of the link 31, as shown in Fig. 2. During the first part of the movement, however, the loop remains in engagement with the link 31 and, before its automatic disengagement, effects the backward movement of the link 31 and arm 21 and the consequent lowering of the tools. It is obvious that when the loop 32 is disengaged from the link 31, the latter is free to slide through the former.

When the parts are in the position shown in Fig. 2, the springs 33 are exerting tension on the suspending devices 20 and 21, tending to draw them forward, said devices being thereby held yieldingly or in a floating position. Should the driver desire to lower either of the sets of tools a short distance below their normal positions, he can do so by pressing with his foot downward upon the drag bar or frame, said frames being preferably provided with stirrups or foot rests 46. Such downward movement is mainly resisted by the chain 38 which pulls upon the spring 33 on lines transverse thereto so as to utilize its resiliency in the manner above referred to. It is clear that the intensity of this resistance may be varied by changing the point of adjustment of chain 38 on lever 39 as well as by adjustment of said lever. When the tools are thus carried downward somewhat below their normal position, the necessary backward motion of the radius arms 21 is permitted both by reason of the slot 31<sup>b</sup> in which the pin 21<sup>b</sup> of the radius arm may move, and also by reason of the fact that the forward end of the link 31 is free to move with respect to the lever 26. It will be seen, however, that the links 31 serve to positively limit the extent of the downward movement of the tools.

While the elevation of the tools is readily effected by the draft of the team in the manner above described, it is evident that the driver is not dependent upon this source of power to do the work but can at any time, as for example when the implement is at rest, effect the lifting of the tools by means of the hand lever 28, the connections of the latter with the levers 26 being such that when the hand lever is manually forced upward, the wheels are moved backward with respect to the main frame in the same manner as when the movement is affected by the draft of the team. Furthermore, either or both of the tool bars or frames may be manually raised to inoperative position at any time without the operation of the hand lever, this being possible by reason of the detachable form of connection between the links 31 and the levers 26.

What I claim is:

1. The combination of the frame, the tool bar movably connected to the frame, the suspension rod for the tool bar, the radius arm pivotally mounted on the frame and flexibly connected to the suspension rod, the swinging wheel axle, positive connections between said axle and the radius arm, and a yielding suspension device connected to the frame and the radius arm, the positive connections between the swinging axle and radius arm comprising a lost motion coupling to permit the tool bar to be forced below the normal working position at which it is sustained by the said yielding suspension device, substantially as set forth.

2. The combination of the frame, the tool bar movably connected to the frame, the suspension rod for the tool bar, the radius arm pivotally mounted on the frame and flexibly connected to the suspension rod, actuating devices for the suspension rod and radius arm, and connections between the said actuating devices and the suspension rod and radius arm adapted to move the latter to lift the tool bar and to automatically disengage to permit the lifting of the tool bar independently of the actuating devices, substantially as set forth.

3. The combination of the frame, the tool bar movably connected to the frame, the suspension rod for the tool bar, the radius arm pivotally mounted on the frame and flexibly connected to the suspension rod, said arm and rod being adapted to be moved to one position when the tool bar is elevated and to another position when the tool bar is in its working position, and power operated devices having automatically disengaging connections with the rod and arm and adapted to move them from their first aforesaid position to their second positions, substantially as set forth.

4. The combination of the frame, the tool bar movably connected to the frame, the suspension rod for the tool bar, the radius arm pivotally mounted on the frame and flexibly connected to the suspension rod, the swinging wheel axle, the shaft mounted transversely of the frame, the lever mounted intermediate its ends on said shaft, connections between the axle and one end of said lever, connections between the radius arm and the other end of said lever, and transversely adjustable tool bars flexibly connected to the transverse shaft, substantially as set forth.

5. The combination of the frame, the tool bar movably connected to the frame, the suspension rod for the tool bar, the radius arm pivotally mounted on the frame and flexibly connected to the suspension rod, said rod and arm being movable to one position when the tool bar is elevated and to another position when the tool bar is in its operative position, and power transmitting devices arranged to engage with the suspension rod at points between its ends for moving it and the radius arm from the first of its aforesaid positions to the second aforesaid position, substantially as set forth.

6. The combination of the frame, the tool bar movably connected to the frame, the suspension rod for the tool bar, the radius arm pivotally mounted on the frame and flexibly connected to the suspension rod, the spring arranged to draw the said rod and arm to one position when the tool bar is elevated, and means for moving the rod and arm to another position when the tool bar is to be lowered, said means comprising devices engaging the said rod and arm at points between their ends, substantially as set forth.

7. The combination of the frame, the tool bar movably connected to the frame, the suspension rod for the tool bar, the radius arm pivotally mounted on the frame and flexibly connected to the suspension rod, the spring for moving the said rod and arm to one position when the tool bar is elevated, power transmitting devices engaging detachably with the rod and arm for moving them to another position when the tool bar is to be lowered, and a lever on the frame for actuating the said power transmitting devices, substantially as set forth.

8. The combination of the frame, the tool bar, the suspension rod for the tool bar, the radius arm pivotally mounted on the frame and flexibly connected to the suspension rod, means for moving the rod and arm to one position when the tool bar is to be elevated, and power devices for moving them to another position when the tool bar is to be lowered, comprising a link adapted to engage with one of the aforesaid tool bar supporting members, to wit, the suspension rod and radius arm, substantially as set forth.

9. The combination of the frame, the tool bar movably connected thereto, the suspension rod for the tool bar, the radius arm pivotally mounted on the frame and flexibly connected to the suspension rod, and the movable bar interposed between the suspension rod and the radius arm and adapted to lock them against movement when the tool bar is elevated and to move them toward the positions occupied when the tool bar is lowered, substantially as set forth.

10. The combination of the frame, the tool bar movably connected thereto, the suspension rod for the tool bar, the radius arm pivotally mounted on the frame and flexibly connected to the suspension rod, said rod and arm being movable with the tool bar when the latter moves from its elevated position to its lower operative position, and means interposed between the suspension rod and radius arm and adapted to hold them against longitudinal forward movement relative to each other and against relative lateral movement, substantially as set forth.

11. The combination of the frame, the tool bar movably connected to the frame, the suspension rod or the tool bar, the radius arm pivotally mounted on the frame and flexibly connected to the suspension rod, means interposed between said arm and rod for holding them against longitudinal forward movement and relative lateral movement, and power transmitting devices engaging said means for moving the rod and arm backward, substantially as set forth.

12. The combination of the frame, the tool bar movably connected to the frame, the suspension rod for the tool bar, the radius arm pivotally mounted on the frame and flexibly connected to the suspension rod, the spring for drawing the said rod and arm forward, means interposed between said arm and rod for holding them against longitudinal forward movement and relative lateral movement, and power transmitting devices engaging said means for moving the rod and arm backward, substantially as set forth.

13. The combination of the frame, the tool bar movably connected to the frame, the suspension rod for the tool bar, the radius arm pivotally mounted on the frame and flexibly connected to the suspension rod, power actuating means for swinging the radius arm and suspension rod to raise and lower the tool bar, and automatically disengagable connections between said actuating means and radius arm adapted to permit the lifting of the tool bar independently of said actuating means, substantially as set forth.

14. The combination of the frame, the tool bar movably connected to the frame, a suspension rod for the tool bar, the radius arm pivotally mounted on the frame and flexibly connected to the suspension rod, power actuating means for swinging the radius arm and suspension rod to raise and lower the tool bar, and connections between the actuating means and radius arm adapted both to positively transmit the power of the actuating means for raising and for lowering the tools and to permit the lifting of the tool bar independently of the actuating means, substantially as set forth.

15. The combination of the frame, the tool bar movably connected to the frame, the suspension rod for the tool bar, the radius arm pivotally mounted on the frame and flexibly connected to the suspension rod, means operable by the draft of the team for swinging the radius arm forward to lift the tool bar, and manual means for swinging the radius arm rearward to lower the tool bar, the connections between said draft operated and manual means and the radius arm being adapted to positively transmit the movement of the said means to the radius arm and to permit the raising of the tool bar independently of the draft operated and manual means, substantially as set forth.

16. The combination of the frame, the tool bar movably connected to the frame, the suspension rod for the tool bar, the radius arm pivotally mounted on the frame and flexibly connected to the suspension rod, and power operated means for swinging the radius arm and suspension rod to raise and lower the tool bar, the said power operated means being adapted to positively limit the forward and backward swing of the arm and rod and to hold them in their forward position, substantially as set forth.

17. The combination of the frame, the tool bar, the suspension rod connected to the tool bar, the radius arm pivotally mounted on the frame and flexibly connected to said suspension rod, the lifting spring arranged to draw upward on the tool bar and adapted to sustain it in a normal working position and to permit it to be carried below said position, and means for positively limiting the downward movement of the tool bar, substantially as set forth.

18. The combination of the frame, the tool bar pivotally connected thereto, the suspension rod connected to the rear part of the tool bar, the radius arm pivotally mounted on the frame and flexibly connected to the suspension rod, the spring arranged to exert an upward lifting action on the tool bar and to hold it in a normal working position, and the stop for limiting the downward movement of the tool bar, said stop being movable with the suspension rod and radius arm, substantially as set forth.

19. The combination of the frame, the tool bar movably connected to the frame, the suspension rod for the tool bar, the radius arm pivotally mounted on the frame and flexibly connected to the suspension rod, the spring having a fixed connection with the frame and two sets of connecting devices interposed between the spring and the radius arm, one set being adapted to transmit tension from the spring on lines longitudinal thereof to the radius arm at a point near its base pivot and the other set being adapted to transmit force directly from the spring on lines transverse thereto to the radius arm at a point near the outer end thereof, substantially as set forth.

20. The combination of the frame, the tool bar movably connected to the frame, the suspension rod for the tool bar, the radius arm pivotally mounted on the frame and flexibly connected to the suspension rod, the swinging wheel axle, the lever pivoted on the frame intermediate its ends, positive connections between one end of said lever and the swinging axle, positive connections between the other end of said lever and the radius arm, and manually controlled locking means adapted when unlocked to permit the draft of the team to swing the axle backward and the radius arm forward, substantially as set forth.

21. The combination of the frame, the tool bar movably connected to the frame, the suspension rod for the tool bar, the radius arm pivotally mounted on the frame and flexibly connected to the suspension rod, a wheel movable forward and backward relatively to the frame, the lever 26 mounted on the frame and connected to the wheel axle, the hand lever connected to the lever 26, and means connecting the lever 26 to the radius arm and suspension rod and adapted to swing them forward and backward to raise and lower the tool bar, substantially as set forth.

22. The combination of the main frame, the two cranked axles mounted one on each side of the main frame with freedom to swing with relation to said frame, the ground wheels on the axles, the shaft mounted transversely of the main frame, the tool bars having their front ends adjustably mounted on said shaft, the two levers secured to their respective ends of the said shaft, a link connecting one of the levers to the swinging axle on the same side of the main frame, a second link connecting the other lever to the swinging axle on its side of the main frame, and a locking hand lever for turning said shaft to simultaneously swing the axles and for locking the shaft and said axles in adjusted position, substantially as set forth.

23. The combination of the main frame, the shaft mounted transversely thereon, the tool bars having their front ends adjustably mounted on said shaft with freedom to rise and fall without turning said shaft, the levers secured to the ends of the shaft, the cranked axles pivotally mounted on the frame, links connecting the vibrating ends of the axles to the said levers, and a hand lever for oscillating said shaft to swing the axles, substantially as set forth.

24. The combination of the frame, the tool bar movably connected to the frame, the suspension rod for the tool bar, the radius arm pivotally mounted on the frame and flexibly connected to the suspension rod, the swinging wheel axle, the lever pivoted on the frame intermediate its ends, positive connections between one end of said lever and the swinging axle, positive connections between the other end of said lever and the radius arm, and means for swinging the axle and radius arm backward and forward, substantially as set forth.

25. The combination of the frame, the tool bar movably connected to the frame, the suspension rod for the tool bar, the radius arm pivotally mounted on the frame and flexibly connected to the suspension rod, the swinging wheel axle, the lever pivoted on the frame intermediate its ends, positive connections between one end of said lever and the swinging axle, positive connections between the other end of said lever and the radius arm, and the locking lever adapted when unlocked to permit the swinging of the axle and radius arm, or to be manually moved to swing the axle and radius arm in both directions, substantially as set forth.

26. The combination of the frame, the tool bar movably connected to the frame, the suspension rod for the tool bar, the radius arm pivotally mounted on the frame and flexibly connected to the suspension rod, the swinging wheel axle, the lever pivoted on the frame intermediate its ends, positive connections between one end of said lever and the swinging axle, positive connections between the other end of said lever and the radius arm, the yielding suspending device adapted to normally draw forward on the radius arm, and the manually controlled locking means adapted when unlocked to permit the draft of the team to swing the axle backward and the radius arm forward, the said connections between the axle and radius arm comprising a lost motion coupling to permit the tools to be forced below the normal working position at which they are sustained by the yielding suspending device, substantially as set forth.

27. The combination of the frame, the tool bar movably connected to the frame, the suspension rod for the tool bar, the radius arm pivotally mounted on the frame and flexibly connected to the suspension rod, the swinging wheel axle, the lever pivoted on the frame intermediate its ends, positive connections between one end of said lever and the swinging axle, positive connections between the other end of said lever and the radius arm, the yielding suspending device adapted to normally draw forward on the radius arm, and means for swinging the axle and the radius arm backward and forward, the said connections between the axle and radius arm comprising a lost motion coupling to permit the tools to be forced below the normal working position at which they are sustained by the yielding suspending device, substantially as set forth.

28. The combination of the frame, the tool bar movably connected to the frame, the suspension rod for the tool bar, the radius arm pivotally mounted on the frame and flexibly connected to the suspension rod, the swinging wheel axle, the lever pivoted on the frame intermediate its ends, positive connections between one end of said lever and the swinging axle, positive connections between the other end of said lever and the radius arm, the yielding suspending device adapted to normally draw forward on the radius arm, and the locking lever adapted when unlocked to permit the swinging of the axle and radius arm, or to be manually moved to swing the axle and radius arm in both directions, substantially as set forth.

In testimony whereof I affix my signature, in presence of two witnesses.

STALEY D. POOLE.

Witnesses:
EUGENE L. TAYLOR,
FRED H. COOPER.

---

Copies of this patent may be obtained for five cents each, by addressing the "Commissioner of Patents, Washington, D. C."